United States Patent

[11] 3,608,806

[72] Inventor Helge Butte
Fuerth, Germany

[21] Appl. No. 35,722
[22] Filed May 8, 1970
[45] Patented Sept. 28, 1971
[73] Assignee Grundig E.M.V., Elektro-Mechanische Versuchtsanstalt, Inh.: Max Grundig Fuerth am Bay, Germany
[32] Priority May 13, 1969
[33] Germany
[31] P 19 24 306.2

[54] TAPE-STOPPING MECHANISM FOR MAGNETIC TAPE RECORDING AND PLAYBACK APPARATUS
11 Claims, 2 Drawing Figs.

[52] U.S. Cl. ........................................................ 226/176
[51] Int. Cl. ........................................................ G11b 15/24
[50] Field of Search ............................................ 226/176, 177, 186, 187, 180

[56] References Cited

UNITED STATES PATENTS

| | | | |
|---|---|---|---|
| 2,828,961 | 4/1958 | Rehklau ...................... | 226/176 |
| 3,148,819 | 9/1964 | Frick et al. ..................... | 226/176 |
| 3,373,913 | 3/1968 | Atsumi ......................... | 226/176 |

*Primary Examiner*—Allen N. Knowles
*Attorney*—Michael S. Striker

ABSTRACT: An arrangement for rapidly stopping the movement of magnetic tape in recording and playback devices. The tape is driven between a rotating driving or transport shaft and a rubberized pressure roller which presses the tape against the driving shaft. A geared speed reducer is mechanically linked to the shaft of a miniature motor which is rotatable in both directions and is battery-operated. The output of the speed reducer drives an eccentric and a cam mechanism. The eccentric actuates the rubber pressure roller to move it away from the tape and the driving shaft when the movement of the tape is to be stopped. At the same time, the cam operates a switch which results in short circuiting of the motor to provide electrodynamic braking whenever the tape is to be stopped. A remote control switch in either the microphone or foot switch may be operated in conjunction with the recorder and playback apparatus.

Inventor:
HELGE BUTTE
By: Michael J. Striker
Attorney

TAPE-STOPPING MECHANISM FOR MAGNETIC TAPE RECORDING AND PLAYBACK APPARATUS

BACKGROUND OF THE INVENTION

The present invention resides in a rapid-stopping mechanism for stopping the motion of a tape transport mechanism by removing the pressure roller from the sound shaft in a battery-operated magnetic tape recorder.

In magnetic tape recorders, heretofore, the magnetic tape is transported between a rubber pressure roller and a sound shaft. For purposes of stopping the motion of the tape, the pressure roller is somewhat moved out of contact or away from the tape and the sound shaft. A rapid-stopping position exists at an intermediate position of the transport mechanism, between the stopping position and the normal operating position. This intermediate rapid-stopping position has the advantages that the mechanical driving means such as the motor and rotational elements, as well as the electrical amplifying elements are operable and regulatable. The arrangement is such that by transferring to normal operation, the squeaking sound accompanying high motor speeds, is avoided, so that the substantially clear magnetic tape recording and playback is realizable.

It is an object of the present invention to provide a rapid-stopping arrangement for a remote-controlled unit which is controlled, for example, through a microphone switch or a foot switch. It is the object, furthermore, of the present invention that the rapid-stopping arrangement consumes a minimum amount of battery current by requiring no current when in the initial or inoperative state. It is also the object of the present invention to provide a rapid-stopping arrangement of the foregoing character, which requires no particular brake.

The objects of the present invention are achieved by using a miniature electrical motor and alternatingly operating the motor in opposite directions, the motor drives through a geared speed reduction mechanism which, in particular, is made of spur gears. Through this gearing arrangement, the motor drives an eccentric for controlling the pressure roller, and a cam which controls a switch that serves to brake electrodynamically the motor.

SUMMARY OF THE INVENTION

An arrangement for use in conjunction with magnetic tape recorders for the purpose of rapidly stopping the tape transport mechanism. The tape is driven by being pressed between a driving shaft and a rubber pressure roller. The speed of a motor rotatable in both directions of motion is stepped down through a geared speed reducer made of a train of spur gears. An eccentric in the form of a hub member or a recessed portion, is provided on the slowest gear of the train. The eccentric actuates a lever which, in turn, causes the rubber pressure roller to be moved away from the driving shaft. Through a cam and switch arrangement, as well as a remote switch in either a microphone or foot switch, for example, the motor is short circuited when it is desired that the tape transport be stopped. The short circuiting of the motor provides for electrodynamic braking of the motor and thereby rapid stoppage of the tape motion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
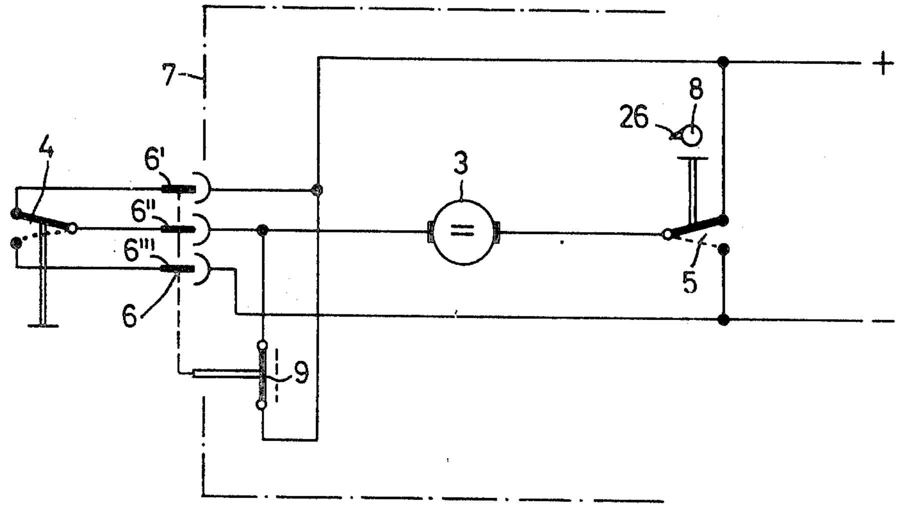
FIG. 2 is an electrical circuit diagram for electrodynamically braking the motor in the arrangement of FIG. 1.

Referring to the drawing, the rapid-stopping arrangement, in accordance with the present invention, serves to stop the motion of a tape transport mechanism through removal of the rubber pressure roller 1 from the sound shaft 2 in a conventional magnetic tape sound recorder, not shown. The recorder may be operated through a battery, for example, and may be in the form of a reporting or dictating type of recorder. The magnetic tape which is not shown, is transported in the conventional manner, between the shaft 2 and the rubber pressure roller 1. A miniature DC motor 3 with permanent magnets is operated from a battery, and drives the rapid-stopping arrangement of the present invention. The circuitry for the operation of the motor is shown in FIG. 2.

The miniature DC motor 3 may be operated in both directions of motion through the two switches 4 and 5. The motor is, furthermore, short circuitable through these switches for purposes of electrodynamic braking. The switch 4 shown in FIG. 2 may be actuated through a microphones switch or through a foot switch for the purpose of remote control. This switch 4 is connectable to the magnetic tape recorder 7, through a plug-in connector 6. The second switch 5, on the other hand, is actuated through a cam 8, in a manner to be described. FIG. 2 shows the initial or starting state of the motor circuitry. In this initial state, the motor 3 is short circuited through the contact 5, the contact 6'' and the switching contact 4, as well as the contact 6'. The separate contact 9 is in the open position, since the latter becomes automatically opened when the plug-in connector 6 is in plugged-in position or closed position. Conversely, the contact 9 becomes closed when the plug-in connector 6 is opened or removed.

Figure 1:
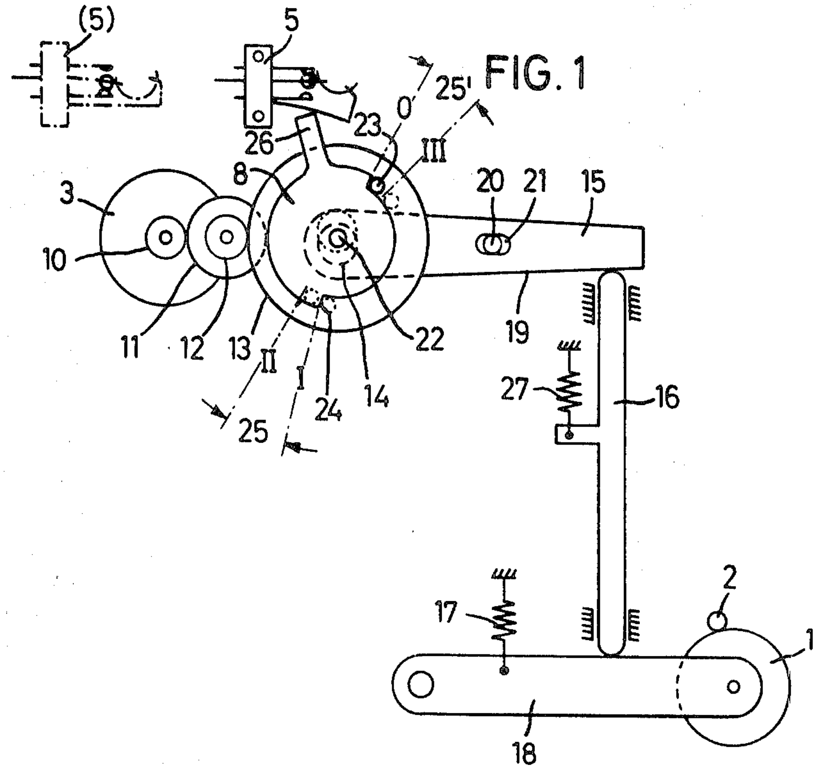
FIG. 1 is a schematic plan view of the essential elements of the rapid-stopping arrangement for magnetic tape recording and playback apparatus, in accordance with the present invention.

In accordance with FIG. 1, the miniature motor 3 drives an eccentric 14, through a speed-reducing drive made of, in particular, gears 10 to 13. The final gear 13 driven at the lowest speed is provided with an eccentric boss or hub for the purpose of driving a first reciprocating rod 15. The gear 13 may also be, on the other hand, provided with a recess instead of a hub for this purpose. The rod or link 15 is either directly in contact with the lever 18, or transmits motion to this lever 18 through a further connecting rod 16. The lever 18 carries the rubber pressure roller 1, and is held against the rod 16 through the spring 17. Depending upon the position of the eccentric 14, the lever 18 is actuated to either remove the pressure roller 1 from the shaft 2, or to move, on the other hand, the roller 1 against the shaft 2. The first motion transmission rod 15 moves angularly, and for this reason, an inclined surface 19 is brought to bear against the end of the second rod or link 16. A fixed pin or shaft 20, furthermore, serves to guide the motion transmission rod 15, in addition to the guidance action provided by the eccentric 14. The fixed pin or shaft 20 projects into an elongated slot 21 of the rod 15. The pin 20 serves to provide the fulcrum or pivoting axis for the rod 15.

A cam 8 is mounted coaxially with the gear 13. The cam 8 is provided with a subdivided hub, not shown. The hub elements are held through spring action against the fixed shaft or axle 22 of the gear 13. The gear 13 as well as the cam 8 are made, for example, of plastics through injection molding. The gear 13, furthermore, carries a pin 23 which rests against a pocket or edge of the cam 8, joining two different diameters of this cam. Thus, the cam 8 possesses a surface made of one diameter, and the surface of a larger diameter. These two surfaces are joined through an edge against which the pin 23 bears. In the position of pin 23 in FIG. 1, the arrangement is in the initial or inoperative position. It is assumed that for normal operation of the magnetic tape recorder 7, the latter is connected in accordance with the arrangement of FIGS. 1 and 2.

In transferring the position of the rapid-stopping mechanism, from its inoperative state, the center contact of the switch 4 is transferred in position. As a result, positive DC potential is applied to one terminal of the motor 3, through the switching contact 5. The other terminal of the motor 3 has negative DC potential applied to it, through the contact 6'', switching contact 4, 6'''. The miniature motor 3 is thereby set into operation and drives in a clockwise manner the pin 23 against the abutting surface 24 of the cam 8. The pin 23 thereby moves the cam 8 against the action of friction between the cam and the fixed axle 23. In particular, the pin 23 moves the cam 8 in this manner through an angular path 25. This action of the pin 23 and cam 8, serves to transfer the switch 5 from the position shown in solid lines in FIG. 1, to the position shown in phantom in that same Figure. The switch 5 is constructed as a monostable type of switch. Once this switch 5 has been actuated in this manner, the switch assumes the position of the dotted lines shown in the circuit diagram of FIG. 2. In this latter position of the switch 5, the miniature motor 3 is short circuited through the contact 5, the contact 6‴contact 4, and contact 6″. As a result of this short circuiting of the motor 3, the motor becomes immediately braked electrodynamically. The pressure roller 1 is simultaneously removed from the shaft 2 through the eccentric 14, in the manner described above. As a result, the movement of the tape is stopped. To return to normal operation, the remote switch 4 is again transferred to its upper starting position, shown in FIG. 2, so that the circuit is established in which one terminal of the motor 3 has negative DC voltage applied to it through the contact 5, and the other terminal of the motor 3 has positive voltage applied to it through the contact 6″, switching contact 4, and contact 6′. With the circuit condition, however, the motor operates in the opposite direction of rotation. The pin 23, consequently, rotates in a counterclockwise direction and out of the position denoted by the dash-dot lines II, in FIG. 1. The pin 23 returns thereby to its initial position designated 0, and takes along there with the cam 8 during the last portion 25′ of its path. The bumper-actuating portion 26 of the cam 8 is thereby rotated through the path 25′, and the switch 5 again assumes the position corresponding to the situation illustrated in FIGS. 1 and 2, in solid lines. When this occurs, the motor 3, in FIG. 2, is short-circuited through the circuit including the contact 5, contact 6″, switching contact 4, and contact 6′. With the short circuiting of the motor in this manner, the latter becomes electrodynamically braked. At the same time, the eccentric 4 has been removed from the upper dotted position, and transferred into the lower position designated by dashed or broken line. As a result, the rod or link 15 is pivoted in the counterclockwise direction, so that the second link or rod 16 is driven in the upward direction through the action of springs 17 and 27. These motions of the links 15 and 16, causes the rubber pressure roller 1 to be brought against the shaft 2. In this manner, motion or transport of the magnetic tape is resumed in the normal manner.

As shown in FIG. 2, the remote control switch 4 is connected to the magnetic tape recorder 7, through a plug-in connector 6. Upon removal of this connector 6, the contact 9 becomes closed. As a result of the closure of the contact 9, the motor 3 is driven to its initial position by having one terminal connected to negative DC voltage, through contact 5, and the other terminal connected to positive voltage through contact 9. Once the motor reaches its initial position, the switch 5 changes position to that shown in FIGS. 1 and 2, and the motor is thereby short circuited through both the contacts 5 and 9. Once the motor is thus short circuited, it becomes completely stopped.

It will be understood that each of the elements described above, or two or more together, may also find a useful application in other types of constructions differing from the types described above.

While the invention has been illustrated and described as embodied in stopping arrangements for tape recorders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for stopping the motion of tape transported in magnetic tape recording and playback apparatus comprising, in combination, driving shaft means for driving said tape; pressure roller means movable against said shaft means for pressing said tape against the surface of said shaft means; motor means rotatable in both directions of motion; speed-reducing means mechanically connected to the shaft of said motor means for reducing the speed thereof; eccentric means linked to said speed-reducing means and driven at reduced speed from said motor means by said speed-reducing means, said eccentric means controlling the position of said pressure roller means; cam means actuated by said speed-reducing means; and switching means operated by said cam means for electrodynamically braking said motor means.

2. The arrangement as defined in claim 1 wherein said speed-reducing means comprises a geared speed reducer.

3. The arrangement as defined in claim 1 wherein said motor means comprises an electrical miniature motor.

4. The arrangement as defined in claim 3 wherein said magnetic tape recording and playback apparatus comprises battery-operated apparatus.

5. The arrangement as defined in claim 1 wherein said eccentric means and said cam means are mounted coaxially.

6. The arrangement as defined in claim 5 including a first rod positioned by said eccentric means; a second rod movable against said first rod; spring means for moving said second rod against said first rod and for moving said pressure roller means against said shaft means.

7. The arrangement as defined in claim 6 wherein said eccentric means comprises a hub-shaped member.

8. The arrangement as defined in claim 6 wherein said eccentric means comprises a recess portion on said speed-reducing means.

9. The arrangement as defined in claim 6 including a pin on said speed-reducing means for actuating said cam means through a predetermined angle whereby said switching means is operated.

10. The arrangement as defined in claim 9 including remote-control switching means connected to said motor means and said switching means for electrodynamically braking said motor means through short circuiting said motor means.

11. The arrangement as defined in claim 10 including plug-in connector means for connecting said remote control switching means to said motor means and said switching means; auxiliary switching means actuated by said plug-in connector means so that said auxiliary switching means is closed when said plug-in connector means is disconnected from said motor means and said switching means, said motor means returning to its initial inoperative state when said plug-in connector means is disconnected from said motor means and said switching means, said motor means being stopped in operation when in said initial inoperative position, through said switching means operated by said cam means.